United States Patent
Lalanne-Magne et al.

(10) Patent No.: US 6,187,878 B1
(45) Date of Patent: Feb. 13, 2001

(54) POLYMERISATION PROCESS

(75) Inventors: Claudine Viviane Lalanne-Magne, Saint Mitre les Remparts; Erick Dominique Daire, Martigues; Bruno Patrice Soulier, Martigues; Jean-Pierre Isnard, Martigues, all of (FR)

(73) Assignee: BP Chemicals Limited, London (GB)

( * ) Notice: Under 35 U.S.C. 154(b), the term of this patent shall be extended for 0 days.

(21) Appl. No.: 09/471,419

(22) Filed: Dec. 23, 1999

Related U.S. Application Data

(63) Continuation of application No. PCT/GB98/01639, filed on Jun. 4, 1998.

(30) Foreign Application Priority Data

Jun. 27, 1997 (EP) .................................................. 97430017

(51) Int. Cl.⁷ .................................................. C08F 2/34
(52) U.S. Cl. ................................. 526/68; 526/67; 526/88; 526/901
(58) Field of Search ............................... 526/67, 68, 901, 526/88

(56) References Cited

U.S. PATENT DOCUMENTS

| | | |
|---|---|---|
| 5,352,749 | 10/1994 | DeChellis et al. . |
| 5,376,742 | 12/1994 | Krause . |
| 5,541,270 | 7/1996 | Chinh et al. . |
| 5,668,228 | 9/1997 | Chinh et al. . |
| 5,733,510 | 3/1998 | Chinh et al. . |
| 5,898,053 * | 4/1999 | Leaney et al. ...................... 526/68 |

FOREIGN PATENT DOCUMENTS

| | | |
|---|---|---|
| 0 089 691 | 9/1983 | (EP) . |
| 0 824 116 | 2/1998 | (EP) . |
| WO 94/25495 | 11/1994 | (WO) . |

* cited by examiner

Primary Examiner—Fred Teskin
(74) Attorney, Agent, or Firm—Finnegan, Henderson, Farabow, Garrett & Dunner, L.L.P.

(57) ABSTRACT

A continuous gas fluidized bed process for the polymerization of olefin monomer(s) wherein the recycled gaseous stream withdrawn from the reactor is divided into two streams (A and B) and that (a) a first stream (A) having been cooled to a temperature at which liquid condenses out is then reintroduced directly into the fluidized bed in the reactor in such a way that, at any time, the condensed liquid is continuously introduced into the bed at a minimum rate of 10 liters of liquid per cubic meter of fluidized bed material per hour, and (b) a second stream (B), which by-passes the above cooling/condensing step, is passed through an exchanger and is then reintroduced into the reactor. The continuous introduction of a liquid into the reactor reduces or even eliminates fouling problems which can be encountered in conventional gas phase olefin polymerization processes.

9 Claims, 3 Drawing Sheets

POLYMERISATION PROCESS

This application is a continuation of International Application No. PCT/GB98/01639, filed Jun. 4, 1998, the content of which is incorporated herein by reference.

BACKGROUND OF THE INVENTION

The present invention relates to a continuous process for the gas-phase polymerisation of olefins in a fluidised bed reactor having improved levels of productivity without fouling. The present invention also relates to a start-up process of a continuous process for the gas-phase polymerisation of olefins in a fluidised bed reactor having improved levels of productivity without fouling. The present invention further relates to a process for handling the incidents during a continuous process for the gas-phase polymerisation of olefins in a fluidised bed reactor having improved levels of productivity without fouling.

Processes for the homopolymerisation and copolymerisation of olefins in the gas phase are well known in the art. Such processes can be conducted for example by introducing the gaseous monomer into a stirred and/or fluidised bed comprising polyolefin and a catalyst for the polymerisation.

In the fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles, polymer product particles and catalyst particles. This bed is maintained in a fluidised condition by the continuous upward flow from the base of the reactor of a fluidising gas which comprises recycle gas from the top of the reactor together with make-up feed. The fluidising gas enters the bottom of the reactor and is passed, preferably through a fluidisation grid, to the fluidised bed.

The polymerisation of olefins is an exothermic reaction and it is therefore necessary to provide means to cool the bed to remove the heat of polymerisation.

In the absence of such cooling the bed would increase in temperature until, for example, the catalyst became inactive or the bed commenced to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, an inert diluent gas such as nitrogen and/or a gaseous chain transfer agent such as hydrogen. Thus the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the above-mentioned type is restricted by the maximum rate at which heat can be removed from the reactor. The rate of heat removal can be increased for example, by increasing the velocity of the recycle gas and/or reducing the temperature of the recycle gas and/or changing the heat capacity of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practice is normally determined by the temperature of the industrial cooling water available on site. Refrigeration can be employed if desired, but this adds to the production costs. Thus, in commercial practice, the use of cooled recycle gas as the sole means of removing the heat of polymerisation from the gas fluidised bed polymerisation of olefins has the disadvantage of limiting the maximum production rates obtainable.

The prior art suggests a number of methods for increasing the heat removal capacity of the recycle stream.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. The specification of EP 89691 states that a primary limitation on the extent to which the recycle gas stream can be cooled below the dew point is in the requirement that the gas-to-liquid ratio be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

EP 173261 relates to a particular means for introducing a recycle stream into fluidised bed reactors and, in particular, to a means for introducing a recycle stream comprising a two phase mixture of gas and entrained liquid as described in EP 89691 (supra).

WO 94/25495 describes a fluidised bed polymerisation process comprising passing a gaseous stream comprising monomer through a fluidised bed reactor in the presence of a catalyst under reactive conditions to produce polymeric product and a stream comprising unreacted monomer gases, compressing and cooling said stream, mixing said stream with feed components and returning a gas and liquid phase to said reactor, a method of determining stable operating conditions which comprises: (a) observing fluidised bulk density changes in the reactor associated with changes in the composition of the fluidising medium; and (b) increasing the cooling capacity of the recycle stream by changing the composition without exceeding the level at which a reduction in the fluidised bulk density or a parameter indicative thereof becomes irreversible.

U.S. Pat. No. 5,436,304 relates to a process for polymerising alpha-olefin(s) in a gas phase reactor having a fluidised bed and a fluidising medium wherein the fluidising medium serves to control the cooling capacity of the reactor and wherein the bulk density function (Z) is maintained at a value equal to or greater than the calculated limit of the bulk density function.

WO 94/28032, the contents of which are hereby incorporated by reference, relates to a continuous gas fluidised bed process in which the recycle gas stream is cooled to a temperature sufficient to form a liquid and a gas. By separating the liquid from the gas and then feeding the liquid directly into the fluidised bed at or above the point at which the gaseous stream passing through the fluidised bed has substantially reached the temperature of the gaseous stream being withdrawn from the reactor, the total amount of liquid which may be reintroduced into the fluidised bed polymerisation reactor for the purpose of cooling the bed by evaporation of the liquid can be increased thereby enhancing the level of cooling to achieve higher levels of productivity.

The separated liquid may be suitably injected into the fluidised bed by means of one or more nozzles arranged therein. The nozzles may be either gas-atomising nozzles in which an atomising gas is used to assist in the injection of liquid or they may be liquid only spray type nozzles.

The above-disclosed processes have all contributed to increase the levels of productivity which are achievable in fluid bed polymerisation processes, which is also one of the objectives according to the present invention. It is known however in the art that a major problem encountered in those high productivity polymerisation processes is the fouling phenomena which can occur at any time in the reactor.

Fouling of the reactor wall is a well-known phenomenon in gas phase polymerisation. During polymerisation fines may stick on the reactor wall and form agglomerates; it can sometimes result from the adhesion of catalyst and polymer particles which melt on the reactor wall. Their presence very often induces fluidisation perturbations which can lead to irreversible problems. For example, when these agglomerates become heavy, they can come off the wall and block the fluidisation grid and/or the polymer withdrawal system. The accumulation of fines and/or agglomerates on the reactor wall will thus be referred as the fouling phenomenon.

There are a lot of disclosures in the prior art relating to fouling phenomena as well as many different explanations and theories as to its occurrence. The type of catalyst used has been said to be responsible for the fouling; static electricity has also been indicated as a cause of fouling; operating conditions have also been considered as important to the occurrence of fouling; in fact, the man skilled in the art has developed as many different possible explanations and solutions as there have been occurrences of fouling. It would be a major advance in the art if the fouling phenomena could be either considerably reduced or eliminated whatever the explanation may be for its occurrence.

It has now been unexpectedly found that where fouling problems occur they can be considerably reduced or even eliminated by using the process according to the present invention.

SUMMARY OF THE INVENTION

A process has now been found which is based on a continuous introduction of condensed liquid into the reactor, which does not have any adverse effect on the composition of the fluidised bed, which does not affect the fluidisation conditions within the reactor and which considerably reduces or even eliminates potential fouling phenomena inside the reactor.

Thus, according to the present invention there is provided a continuous gas fluidised bed process for the polymerisation of olefin monomer selected from (a) ethylene, (b) propylene, (c) mixtures of ethylene and propylene, and (d) one or more other alpha-olefins mixed with (a), (b) or (c), in a fluidised bed reactor by continuously recycling a gaseous stream comprising at least some of the ethylene and/or propylene through the fluidised bed in said reactor in the presence of a polymerisation catalyst under reactive conditions, characterised in that said recycled gaseous stream withdrawn from said reactor is divided into two streams (A and B) and that (a) a first stream (A) having been cooled to a temperature at which liquid condenses out is then reintroduced directly into the fluidised bed in the reactor in such a way that, at any time, said condensed liquid is continuously introduced into said bed at a minimum rate of 10 liters of liquid per cubic meter of fluidised bed material per hour, and (b) a second stream (B), which by-passes the above cooling/condensing step, is passed through an exchanger and is then reintroduced into the reactor.

BRIEF DESCRIPTION OF THE DRAWINGS

The process according to the present invention is illustrated in the accompanying drawings, of which

DETAILED DESCRIPTION OF THE INVENTION

Figure 1:
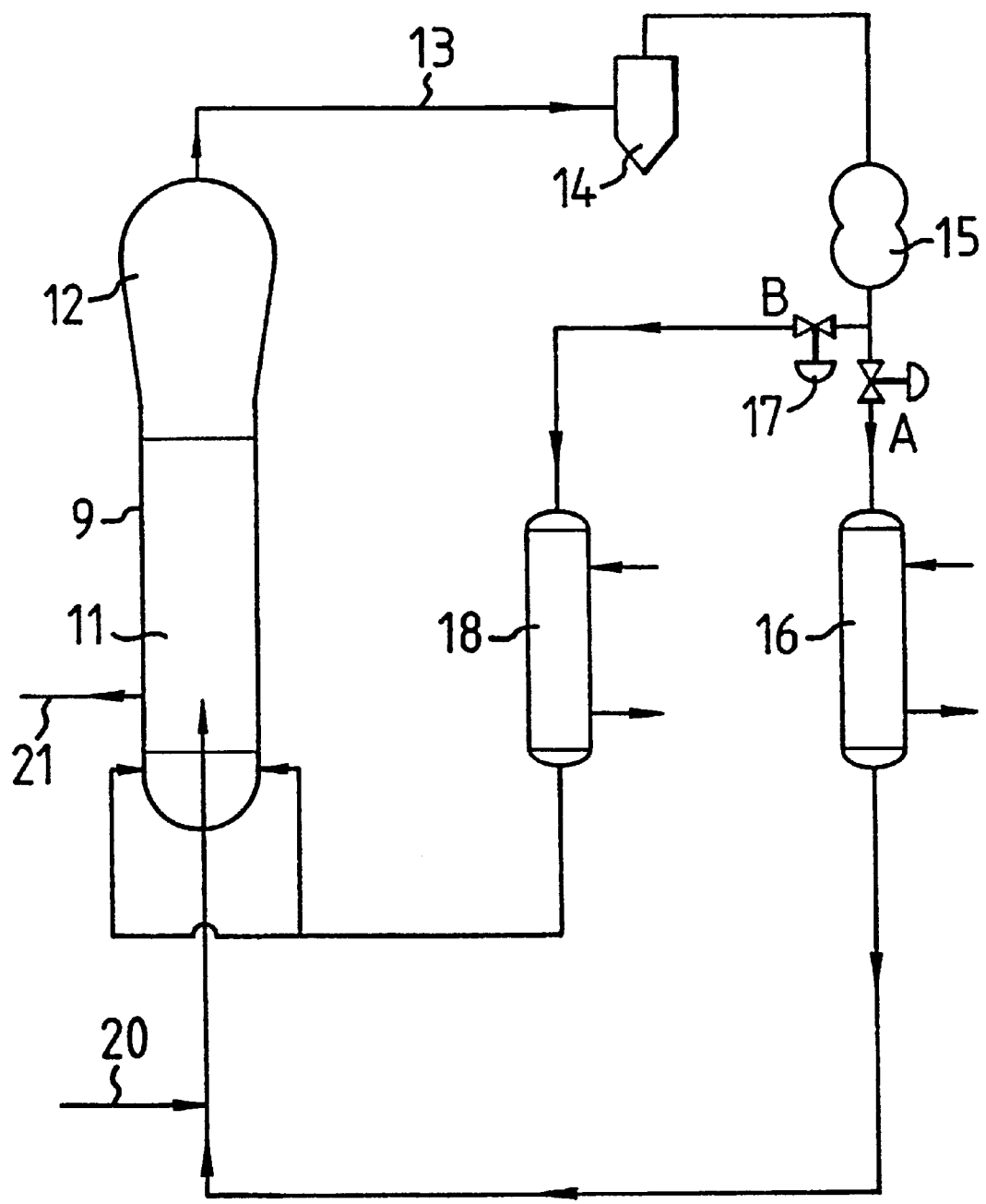
FIG. 1 illustrates a gas-phase fluidised bed reactor for performing the process of the present invention.

According to the present invention it is now possible to early condense part of the recycle gas stream and introduce said condensed liquid directly into the fluidised bed at very low production rate, or preferably before the production begins. The control of the polymerisation reaction is thereby more easily maintained in steady state during the start-up of the process and the amount of liquid entering the fluidised bed is more easily controlled without pertubation of the fluidisation characteristics of the process. One of the most interesting advantages found according to the present invention is the positive influence provided by the present process on the consecutive potential polymerisation problems encountered with the known high productivity polymerisation process, as demonstrated in the accompanying examples.

In particular, it has now been found that the continuous introduction of the condensed liquid into the bed at a minimum rate of 10 liters of liquid per $m^3$ of fluidised bed during the entire process, i.e. from the early beginning and at any consecutive time, results in considerable reduction of or even eliminates all the above-mentioned polymerisation fouling problems. It has further been found that the presence of the second stream (B) and its passage through an exchanger is mandatory according to the present invention. Indeed, operating with said second stream (B) of the present invention allows the process to satisfy both the heat and mass balances.

Preferably the condensed liquid is introduced directly into the fluidised bed above the upper limit of the temperature gradient between the entering fluidising gas (the gaseous stream fed to the reactor) and the remainder of the bed.

According to the present invention the amount of liquid directly injected into the fluidised bed may be controlled by regulating the proportion of the gaseous stream which is cooled to form the two phase mixture.

By use of the process according to the present invention the reaction control is maintained in steady state. Also start-up of the injection of liquid may be carried out at low plant throughput and switchover from conventional operation can be carried out at low capacities when the fluidised bed is not very active. According to a preferred embodiment of the present invention, the cooling/condensing step and the introduction of the condensed liquid in the reactor bed begins before the introduction of the active catalyst into the reactor and/or before polymerisation occurs; under these start-up conditions the second stream (B) is sufficiently heated by the exchanger to accommodate the increase in cooling resulting from the injection of liquid thereby maintaining the heat balance in the process.

The respective proportions of streams (A) and (B), (A) being subjected to the cooling/condensing step and (B) passing through the exchanger, is dependent on which stage the process is at.

The gaseous recycle stream withdrawn from the reactor generally comprises unreacted gaseous monomer(s), and optionally, inert hydrocarbon(s), inert gases such as nitrogen, reaction activator(s) or moderator(s) such as hydrogen as well as entrained catalyst and/or polymer particles (hereafter referred to as "fines"). A majority of these fines may advantageously be removed from the gaseous recycle stream by means of a cyclone.

The gaseous recycle stream fed to the reactor additionally comprises sufficient make-up monomers to replace those monomers polymerised in the reactor.

The process according to the present invention is suitable for the manufacture of polyolefins in the gas phase by the polymerisation of one or more olefins at least one of which is ethylene or propylene. Preferred alpha-olefins for use in the process of the present invention are those having from 3 to 8 carbon atoms. However, small quantities of alpha olefins having more than 8 carbon atoms, for example 9 to 18 carbon atoms, can be employed if desired. Thus, it is possible to produce homopolymers of ethylene or propylene or copolymers of ethylene or propylene with one or more $C_3$–$C_8$ alpha-olefins. The preferred alpha-olefins are but-1-ene, pent-1-ene, hex-1-ene, 4-methylpent-1-ene and oct-1-ene. Examples of higher olefins that can be copolymerised with the primary ethylene or propylene monomer, or as a partial replacement for the $C_3$–$C_8$ alpha-olefin comonomer are dec-1-ene and ethylidene norbornene.

When the process is used for the copolymerisation of ethylene or propylene with alpha-olefins the ethylene or propylene is present as the major component of the monomers, and is preferably present in an amount of at least 65% of total monomer/comonomer.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (APE) which can be for example, homopolyethylene or copolymers of ethylene with a small portion of higher alpha olefin, for example, but-1-ene, pent-1-ene, hex-1-ene or 4-methylpent-1-ene.

The liquid which condenses out of the gaseous recycle stream can be a condensable monomer, e.g. but-1-ene, hex-1-ene, oct-1-ene used as a comonomer for the production of LLDPE or may be an inert condensable liquid, e.g. inert hydrocarbon(s), such as $C_4$–$C_8$ alkane(s) or cycloalkane(s), particularly butane, pentane or hexane.

It is important that the liquid should vaporise within the bed under the polymerisation conditions being employed so that the desired cooling effect is obtained and to avoid substantial accumulation of liquid within the bed. Suitably at least 95, preferably at least 98 weight percent and most preferably substantially all of the liquid fed to the bed evaporates therein. In the case of liquid comonomers, some of the comonomer polymerises in the bed, and such polymerisation can be from the liquid and the gas phase. Associated olefin monomer can readily be tolerated within the bed provided that the quantities do not adversely affect the fluidisation characteristics of the bed.

The process is particularly suitable for polymerising olefins at an absolute pressure of between 0.5 and 6 MPa and at a temperature of between 30° C. and 130° C. For example for LLDPE production the temperature is suitably in the range 70–90° C. and for HDPE the temperature is typically 80–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have been known for a number of years and are capable of producing large quantities of polymer in a relatively short time thereby eliminating the need to remove catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide. The process is also suitable for use with metallocene catalysts either supported or unsupported and Ziegler catalysts supported on silica.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

The first stream (A) is cooled to a temperature such that liquid is condensed in the gaseous recycle stream. This is preferably performed by means of a heat exchanger or exchangers. Suitable heat exchangers are well known in the art.

The second stream (B) passes through one or more exchangers. Said exchanger(s) can either cool or heat the gaseous stream depending on the stage of the process.

According to another preferred embodiment of the present invention, the condensed liquid, produced in the first stream (A) by the cooling/condensing step, is then separated from the gaseous stream before its introduction into the bed.

In yet another embodiment of the present invention the second stream (B) is cooled by an exchanger to a temperature at which liquid condenses out, the condensed liquid being separated from the stream prior to its introduction into the bed.

Suitable means for separating the liquid are for example cyclone separators, large vessels which reduce the velocity of the gas stream to effect separation (knock-out drums), demister type gas-liquid separators and liquid scrubbers, for example, venturi scrubbers. Such separators are well known in the art.

The use of a demister type of gas-liquid separator is particularly advantageous in the process of the present invention.

A further advantage of using a demister type of separator is that the pressure drop within the separator can be lower than in other types of separators thereby enhancing the efficiency of the overall process.

A particularly suitable demister separator for use in the process of the present invention is a commercially available vertical gas separator known as a "Peerless" (Type DPV P8X). This type of separator uses the coalescence of liquid droplets on a baffle arrangement to separate the liquid from the gas. A large liquid reservoir is provided in the bottom of the separator for collection of the liquid and into which the condensable liquid is charged before commencing cooling of the gaseous recycle stream to a temperature at which liquid condenses out. The liquid reservoir enables the liquid to be stored thereby providing control over the introduction of the liquid from the separator into the fluidised bed. This type of separator is very efficient and gives 100% separation of condensed liquid from the gas stream. The separated liquid washes any fines from the baffle arrangement thus avoiding fouling of the baffles.

The condensed liquid produced either directly from the cooling/condensing step or from the separator (preferred embodiment), is then preferably introduced into the fluidised bed above the upper limit of the temperature gradient between the entering fluidising gas and the remainder of the bed. The introduction of condensed liquid may be at a plurality of points within this region of the fluidised bed and these may be at different heights within this region. The point or points of introduction of the liquid are arranged such that the local concentration of liquid does not adversely affect the fluidisation of the bed or the quality of the product, and to enable the liquid to disperse rapidly from each point and vaporise in the bed to remove the heat of polymerisation from the exothermic reaction. In this way the amount of liquid introduced for cooling purposes may much more closely approach the maximum loading that can be tolerated without disturbing the fluidisation characteristics of the bed and hence offers the opportunity to achieve enhanced levels of reactor productivity.

The liquid can, if desired, be introduced into the fluidised bed at different heights within the bed. Such a technique can facilitate improved control over comonomer incorporation. Controlled metering of liquid into the fluidised bed provides useful additional control over the temperature profile of the bed and, in the case that the liquid contains comonomer, provides useful control over the comonomer incorporation into the copolymer.

The liquid is preferably introduced into the lower part of the region of the fluidised bed above the upper limit of the temperature gradient between the entering fluidising gas and the remainder of the bed. Commercial processes for the gas fluidised bed polymerisation of olefins are generally operated under substantially isothermal, steady state conditions. However, although almost all of the fluidised bed is maintained at the desired substantially isothermal polymerisation temperature, there normally exists a temperature gradient in the region of the bed immediately above the point of introduction of the cooled gas stream into the bed. The lower temperature limit of this region wherein the temperature gradient exists is the temperature of the incoming cool gas stream, and the upper limit is the substantially isothermal bed temperature. In commercial reactors of the type which employ a fluidisation grid, typically 10–15 m high, this temperature gradient normally exists in a layer of about 15 to 30 cm (6 to 12 inches) above the grid.

In order to gain the maximum benefit of the cooling of the condensed liquid it is important that the liquid injection means is arranged in the bed above the region where this temperature gradient exists, i.e. in the part of the bed which has substantially reached the temperature of the gaseous stream leaving the reactor.

The point or points of introduction of the liquid into the fluidised bed may for example be approximately 50–200 cm, preferably 50–70 cm above the fluidisation grid.

In practice, the temperature profile within the fluidised bed may first be determined during polymerisation using, for example, thermocouples located in or on the walls of the reactor. The point or points of introduction of the liquid is/are then arranged to ensure that the liquid enters into the region of the bed at which the returned gas stream has substantially reached the temperature of the gaseous recycle stream being withdrawn from the reactor.

It is important to ensure that the temperature within the fluidised bed is maintained at a level which is below the sintering temperature of the polyolefin constituting the bed.

The gas from the second stream (B) and from the separator, if used, is recycled to the bed, preferably into the bottom of the reactor. If a fluidisation grid is employed, such recycle is preferably to the region below the grid, and the grid facilitates uniform distribution of the gas to fluidise the bed. The use of a fluidisation grid is preferred.

The process of the present invention is operated with a gas velocity in the fluidised bed which must be greater than or equal to that required to achieve a bubbling bed. The minimum gas velocity is generally approximately 6 cm/sec but the process of the present invention is preferably carried out using a gas velocity in the range 30 to 100, most preferably 50 to 70 cm/sec.

The catalyst or prepolymer can, if desired, advantageously be introduced into the fluidised bed directly with the condensed liquid stream, separated or not. This technique can lead to improved dispersion of the catalyst or prepolymer in the bed. By injecting the condensed liquid into the fluidised bed in this way, any catalyst which is present in the liquid may benefit from the localised cooling effect of the liquid penetration surrounding each injection means which may avoid hot spots and consequent agglomeration.

If desired, liquid or liquid-soluble additives, for example, activators, cocatalysts and the like, can be introduced into the bed together with the condensed liquid stream, separated or not.

In the case that the process of the present invention is employed to make ethylene homo- or copolymers, make-up ethylene, for example, to replace the ethylene consumed during the polymerisation, may be advantageously introduced at any point of the recycle stream downstream of the cooling/condensing heat exchanger (A), and prior to its reintroduction into the bed (for example below the fluidisation grid if such is employed). By adding the make-up ethylene at said point, the quantity of liquid which may be recovered from the heat exchanger (A) may be increased and the productivity improved.

The condensed liquid may be introduced into the fluidised-bed by suitably arranged injection means. A single injection means may be used or a plurality of injection means may be arranged within the fluidised bed.

A preferred arrangement is to provide a plurality of injection means substantially equally spaced in the fluidised bed in the region of the introduction of the liquid. The number of injection means used is that number which is required to provide sufficient penetration and dispersion of liquid at each injection means to achieve good dispersion of liquid across the bed. A preferred number of injection means is four.

Each of the injection means may, if desired, be supplied with the condensed liquid by means of a common conduit suitably arranged within the reactor. This can be provided, for example, by means of a conduit passing up through the centre of the reactor.

The injection means are preferably arranged such that they protrude substantially vertically into the fluidised bed, but may be arranged such that they protrude from the walls of the reactor in a substantially horizontal direction.

The preferred injection means is a nozzle or a plurality of nozzles which include gas-induced atomising nozzles in which a gas is used to assist in the injection of the liquid, or liquid-only spray-type nozzles.

Suitable gas-induced atomising nozzles and liquid-only nozzles are as described in WO 94/28032 and WO 96/20780 he contents of which are hereby incorporated by reference.

As already indicated, the present invention requires the continuous introduction of condensed liquid into the bed at a minimum rate of 10 liters of liquid per cubic meter of fluidised bed material per hour. Preferably said rate is higher than 40 liters of liquid per cubic meter of fluidised bed material per hour. The highest rate at which liquid can be introduced into the bed depends primarily on the degree of cooling desired in the bed, and this in turn depends on the desired rate of production from the bed. The rates of production obtainable from commercial fluidised bed polymerisation processes for the polymerisation of olefins depend, inter alia on the activity of the catalysts employed, and on the kinetics of such catalysts.

It has also been found that the present invention is particularly useful for handling incidents which can occur during a continuous polymerisation process. The usual incidents encountered in a continuous polymerisation process can be e.g. an interruption of the catalyst injection, a partial poisoning of the reaction or a mechanical failure. With known conventional high productivity (condensation) processes, these kinds of incidents result in a loss of production and a period of operation in non-condensation mode. It has been observed that the periods of non-condensation operation are detrimental to the process and systematically lead to subsequent fouling problems. It has unexpectedly been found that the present invention, which continuously runs in condensation mode, provides a means whereby fouling problems may be substantially reduced or completely eliminated.

According to yet another aspect of the present invention there is provided a start-up process of a continuous gas fluidised bed process for the polymerisation of olefin monomer selected from (a) ethylene, (b) propylene, (c) mixtures of ethylene and propylene, and (d) one or more other alpha-olefins mixed with (a), (b) or (c), in a fluidised bed reactor by continuously recycling a gaseous stream comprising at least some of the ethylene and/or propylene through the fluidised bed in said reactor in the presence of a polymerisation catalyst under reactive conditions, characterised in that said recycled gaseous stream withdrawn from said reactor is divided into two streams (A and B) and that (a) a first stream (A) having been cooled to a temperature at which liquid condenses out is then reintroduced directly into the fluidised bed in the reactor in such a way that, at any time, said condensed liquid is continuously introduced into said bed at a minimum rate of 10 liters of liquid per cubic meter of fluidised bed material per hour, and
(b) a second stream (B), which by-passes the above cooling/condensing step, is passed through an exchanger and is then reintroduced into the reactor.

The start-up process according to the present invention begins before the introduction of the active catalyst inside the reactor and/or before the polymerisation occurs. Thus, according to this preferred embodiment, the cooling/condensing step and the introduction of the condensed liquid into the reactor bed begins before the introduction of the active catalyst inside the reactor and/or before the polymerisation occurs. Under these start-up conditions the second stream (B) is sufficiently heated by the exchanger to accommodate the increase in cooling resulting from the injection of liquid thereby maintaining the heat balance in the process.

According to a further preferred embodiment of the present invention, the catalyst or prepolymer is introduced into the fluidised bed directly with the condensed liquid stream, separated or not. The advantages associated with this technique are an improved dispersion of the catalyst at an early stage of the process which helps prevent the formation of hot spots during the start-up procedure and hence subsequent agglomeration.

Before commencing the introduction of liquid by use of the process according to the present invention the gas phase fluidised bed polymerisation may be started by charging the bed with particulate polymer particles, and then initiating the gas/liquid flow through the bed.

Processes according to the present invention will now be illustrated with reference to the accompanying drawings.

Figure 2:
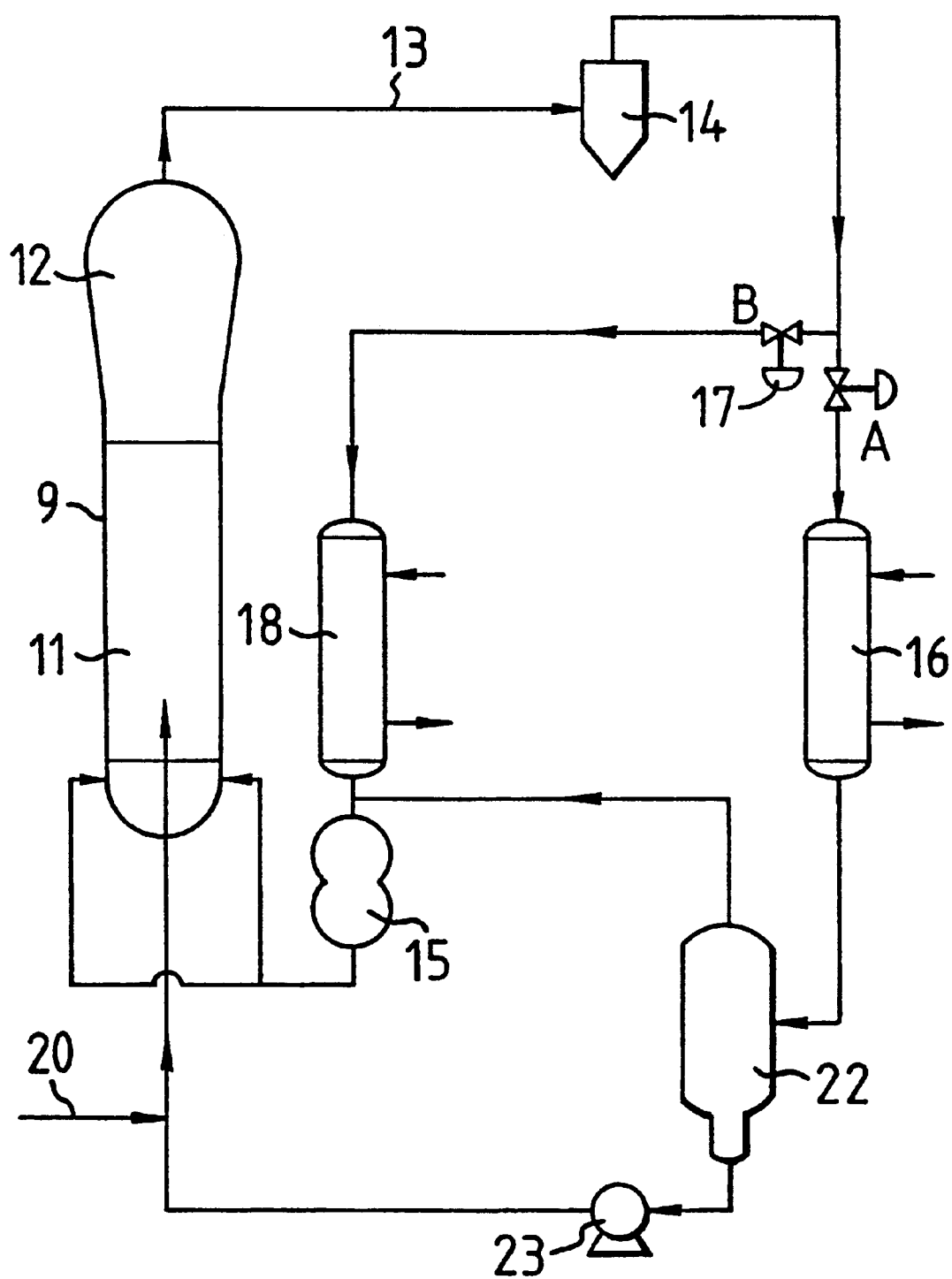
FIG. 2 illustrates a preferred embodiment for performing the process of the present invention.
Figure 3:
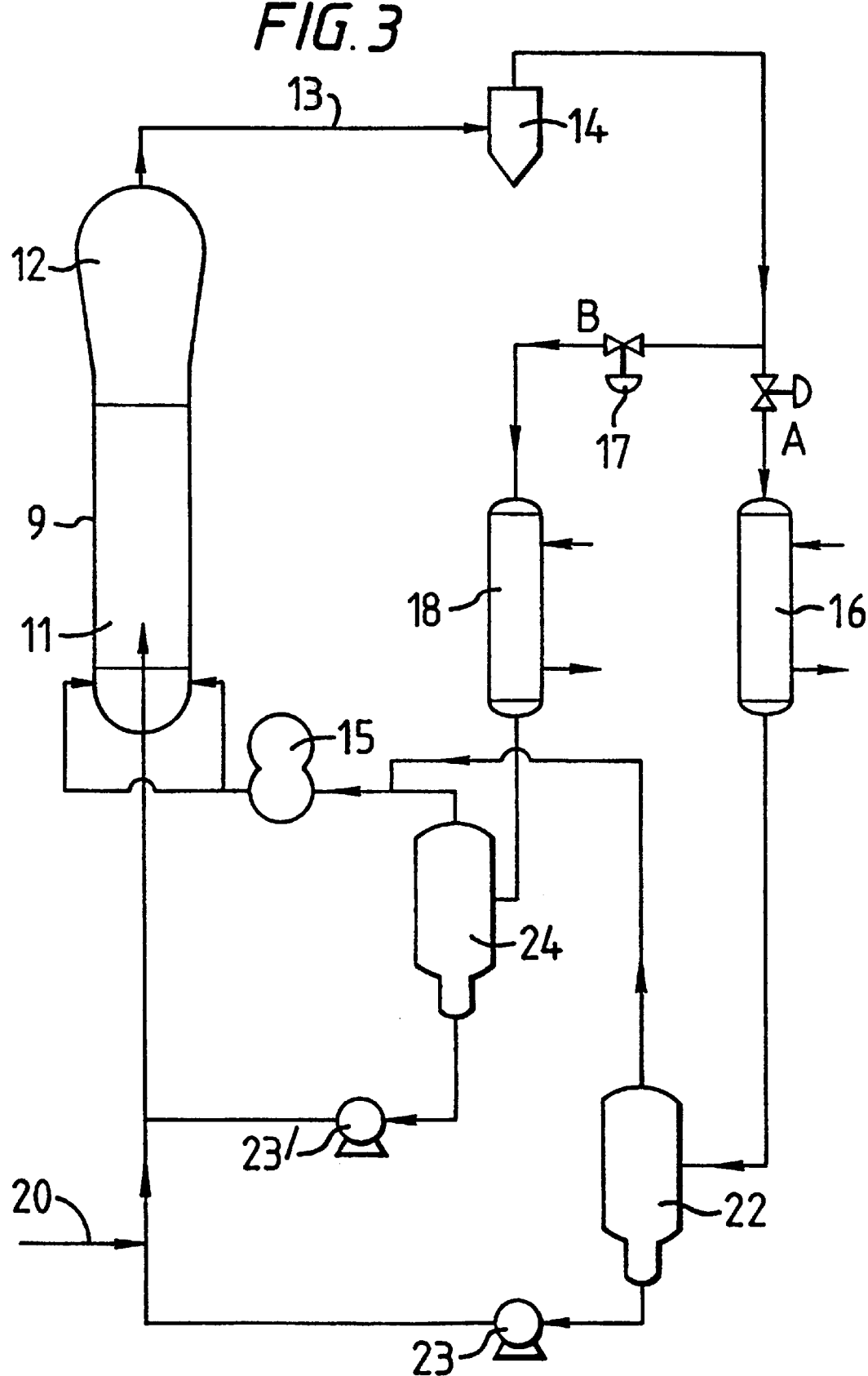
FIG. 3 illustrates a further preferred embodiment for performing the process of the present invention.

FIGS. 1–3 show diagrammatically processes according to the present invention.

FIG. 1 illustrates a gas-phase fluidised bed reactor consisting essentially of a reactor body (9) which is generally an upright cylinder having a fluidisation grid located in its base. The reactor body comprises a fluidised bed (11) and a velocity reduction zone (12) which is generally of increased cross-section compared to the fluidised bed.

The gaseous reaction mixture leaving the top of the fluidised bed reactor constitutes a gaseous recycle stream and is passed via line (13) to a cyclone (14) for the separation of the majority of the fines. Removed fines may suitably be returned to the fluidised bed. The gaseous recycle stream leaving the cyclone passes to a compressor (15). The gaseous recycle stream is then separated into a first stream (A) and a second stream (B).

Stream (A) is passed through a heat exchanger (16) where it is cooled to a temperature at which liquid condenses out and is then reintroduced directly into the fluidised bed in the reactor.

Stream (B) is passed through an exchanger (18) and is then reintroduced in the reactor below the grid. Said gas is passed via the fluidisation grid to the bed thereby ensuring that the bed is maintained in a fluidised condition.

A valve (17) is used for regulating the respective amounts of gaseous streams A and B.

Catalyst or prepolymer are fed to the reactor via line (20) into the condensed liquid stream.

Product polymer particles are removed from the reactor via line (21).

FIG. 2 illustrates a preferred embodiment for performing the process of the present invention. In this arrangement, after the cooling/condensing step in heat exchanger (16), the resultant gas-liquid mixture is passed to the separator (22) where the liquid is separated from the gas. The separated liquid from the separator (22) is reintroduced directly into the bed of the reactor (9). A pump (23) is suitably located downstream the separator (22).

The gas leaving the separator is recycled to the bottom of the reactor (9). FIG. 2 illustrates a further arrangement for performing the process of the present invention whereby the gas leaving the separator is reintroduced together with the gaseous stream (B).

FIG. 2 illustrates a further arrangement for performing the process of the present invention whereby the compressor (I 5) is located after separation of the gaseous recycle stream by the separator (22). This has the advantage that the compressor has a reduced quantity of gas to compress and can therefore be of reduced size achieving a better process optimisation and cost.

FIG. 3 illustrates a further embodiment for performing the process of the present invention. In this arrangement, both recycle lines (A) and (B) are equipped with a gas/liquid separator (22, 24).

The process according to the present invention will now be further illustrated with reference to the following Examples.

EXAMPLE 1

300 kg of an anhydrous polyethylene powder was introduced as a seed bed into a 74 cm diameter fluidised bed reactor under nitrogen. A gaseous mixture heated at 90° C. was then introduced into the reactor. The rising velocity was 38 cm/s.

The gaseous mixture components and their respective partial pressure were:
hydrogen: 0.35 MPa
ethylene: 0.5 MPa
pentane: 0.35 MPa
nitrogen: 0.8 MPa A schematic representation of the apparatus/process used in the present example is given in FIG. 2.

The valve located in line A was regulated such that the gaseous rate is 400 kg/h (line A) represents about 3.1% of the total recycle gaseous rate. The dew point of the gaseous mixture was 66° C.

The temperature at the outlet of the exchanger located on recycle line A was decreased in order to reach 65° C. Condensation occurred in the exchanger; the condensed liquid, i.e. pentane, was separated from the gaseous phase (as indicated in FIG. 2, in the separator 22) and was directly reintroduced into the fluidised bed through a gas/liquid nozzle located at 0.6 m above the fluidisation grid. The liquid flow rate (pentane) was 10 liters per $m^3$ of fluidised bed per hour.

Simultaneously, in order to maintain the temperature inside the reactor at about 90° C., the temperature of the exchanger located on recycle line B was correspondingly increased. In fact said exchanger B needs to compensate the usual thermal loss in the recycle line as well as the cooling brought about by the liquid evaporation in the reactor.

The condensed liquid injection was maintained during about 30 minutes before injection of the catalyst.

Then a conventional Ziegler Natta catalyst was introduced into the reactor at a rate of 20 g/h together with a triethylaluminium cocatalyst.

The production progressively increased until a constant production of 100 kg/h of polyethylene was reached.

The outlet temperature of the heat exchanger located in line A and the gaseous rate flowing through it were still regulated in order to obtain a condensed liquid flow rate of pentane of about 10 liters per $m^3$ of fluidised bed per hour.

The polymerisation was run under stable conditions. No fouling of the reactor was observed.

COMPARATIVE EXAMPLE 2

The operation performed in this example was similar to that carried out in example 1 except that all the recycle gas flowed through line A and thus the bypass line B was not used.

In order to maintain the 90° C. temperature into the reactor before starting polymerisation, the temperature of the exchanger located in said line A was increased accordingly. Therefore, no condensation occurred in this exchanger.

The catalyst was injected following the same procedure as in example I except that no condensed liquid was present in the recycle line during said starting injection catalyst procedure.

After about two hours of production, polymer crusts were found in the production. Detrimental reactor fouling was also observed.

COMPARATIVE EXAMPLE 3

Process Incident Simulation

A stable gas phase polymerisation process was operated in a 74 cm diameter reactor under the following conditions. the reactor contained 800 kg of an active polyethylene powder the gaseous mixture components and their respective partial pressure were:
ethylene: 0.3 MPa
hydrogen: 0.21 MPa
pentane: 0.33 MPa
nitrogen: 0.76 MPa The dew point of the gaseous mixture was 66° C.
The gaseous rising velocity was 38 cm/s.

A conventional Ziegler Natta was introduced into the reactor as a prepolymer at a rate of 1 kg/h; triethylaluminium cocatalyst in pentane was also continuously introduced at a rate of 600 ml/h.

The polyethylene production was about 200 kg/h.
The polymerisation temperature was 90° C.
All the recycle gas flowed through line A; line B was not used.

Under these conditions, and in order to maintain the 90° C. polymerisation temperature, the temperature of the exchanger (line A) was sufficiently cooled at about 62° C. (i.e. lower than the gaseous mixture dew point).

The condensed liquid (pentane) was separated from the recycle gas into a separator and reintroduced into the reactor through a gas/liquid nozzle located at 60 cm above the fluidisation grid. The liquid rate injection was 1000 l per $m^3$ of fluidised bed per hour.

In order to simulate a mechanical failure, the catalyst prepolymer injection was stopped.

The production progressively decreased. Accordingly the cooling requirement of the exchanger (line A) decreased until the temperature of said exchanger passed above the dew point of the gaseous mixture so that no further condensed liquid was produced.

At this stage (no condensed liquid injection into the bed) the polyethylene production reached about 100 kg/h.

About 40 minutes after the condensed liquid injection was stopped, hot spots were detected by wall thermocouples.

Polymerisation was stopped. At the opening of the reactor, melting of part of the bed was observed. It had the appearance of a large agglomerate.

EXAMPLE 4

Process Incident Simulation

The process conditions were exactly the same as those used in comparative example 3.

After the incident simulation, production was decreased and condensed liquid (pentane) injection was also decreased, just as in comparative example 3.

When said condensed liquid flow rate reached about 40 liters per m$^3$ of fluidised bed per hour (which corresponds to a PE production of 136 kg/h), part of the recycle gas passed through the exchanger located in line B wherein the temperature was maintained at about 72° C. (i.e. about 5° C. above the dew point of the gaseous mixture).

Under these conditions it was possible to keep the temperature at the outlet of the exchanger located in line A at about 65° C., i.e. below the dew point of the gaseous mixture.

The respective flow rates passing through lines A and B were regulated in order to have about 14.4% of the total flow rate passing through line A and thereby maintaining a condensed liquid rate of about 40 liters per m$^3$ of fluidised bed per hour.

The temperature inside the reactor was maintained at 90° C. Progressively, polyethylene production decreased and the temperature of the exchanger located in line B increased correspondingly.

No hot spots were registered during the entire procedure and no agglomerates were subsequently observed so that high rates of productivity can be achieved without any problem.

What is claimed is:

1. A continuous gas-phase fluidised bed process for the polymerisation of olefin monomer selected from the group consisting of (a) ethylene, (b) propylene, (c) mixtures of ethylene and propylene, and (d) one or more other alpha-olefins mixed with (a), (b) or (c), in a fluidised bed reactor, said process comprising withdrawing a gaseous stream from the reactor containing at least some of the ethylene and/or propylene, continuously recycling the gaseous stream through the fluidised bed in said reactor in the presence of a polymerisation catalyst under reactive conditions, and dividing said recycling gaseous stream withdrawn from said reactor, before the stream is introduced into the reactor, into two streams, wherein (a) a first stream (A) is cooled to a temperature at which liquid condenses out is then introduced directly into the fluidised bed in the reactor in such a way that, at any time, said condensed liquid is continuously introduced into said bed at a minimum rate of 10 liters of liquid per cubic meter of fluidised bed material per hour, and (b) a second stream (B), which by-passes the above cooling/condensing step, is passed through an exchanger and is then introduced into the reactor.

2. Process according to claim 1 wherein the condensed liquid is introduced directly into the fluidised bed above the upper limit of the temperature gradient between the entering fluidising gas and the remainder of the bed.

3. Process according to claim 1 wherein the second stream (B) is sufficiently heated by the exchanger to accommodate the increase in cooling resulting from the injection of liquid thereby maintaining the heat balance in the process.

4. Process according to claim 1 wherein the second stream (B) is cooled by the exchanger to a temperature at which liquid condenses out, the condensed liquid being separated from the stream prior to its introduction into the bed.

5. Process according to claim 1 wherein the condensed liquid is separated from the gaseous stream before its introduction into the bed.

6. A start-up process of a continuous gas-phase fluidised bed process for the polymerisation of olefin monomer selected from the group consisting of (a) ethylene, (b) propylene, (c) mixtures of ethylene and propylene, and (d) one or more other alpha-olefins mixed with (a), (b) or (c), in a fluidised bed reactor, said process comprising withdrawing a gaseous stream from the reactor containing at least some of the ethylene and/or propylene, continuously recycling the gaseous stream through the fluidised bed in said reactor in the presence of a polymerisation catalyst under reactive conditions, and dividing said recycling gaseous stream withdrawn from said reactor, before the stream is introduced into the reactor, into two streams, wherein (a) a first stream (A) is cooled to a temperature at which liquid condenses out is then introduced directly into the fluidised bed in the reactor in such a way that, at any time, said condensed liquid is continuously introduced into said bed at a minimum rate of 10 liters of liquid per cubic meter of fluidised bed material per hour, and (b) a second stream (B), which by-passes the above cooling/condensing step, is passed through an exchanger and is then introduced into the reactor.

7. Process according to claim 6 wherein the second stream (B) is heated by the exchanger to accommodate the increase in cooling resulting from the injection of liquid thereby maintaining the heat balance in the process.

8. Process according claim 6 wherein the polymerisation catalyst is introduced into the fluidised bed directly with the condensed liquid stream.

9. Process according to claim 6 wherein the introduction of the condensed liquid in the reactor bed begins before the introduction of the polymerisation catalyst inside the reactor and/or before the polymerisation occurs.

* * * * *